Jan. 19, 1971  C. B. TOLLEY  3,555,595
CRAB MEAT SEPARATING APPARATUS
Filed June 24, 1968  4 Sheets-Sheet 2
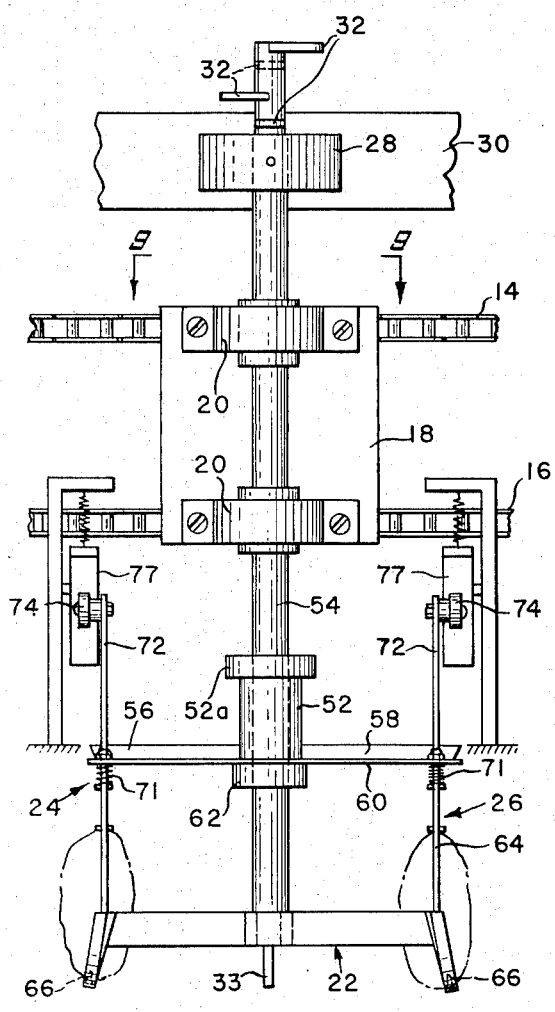
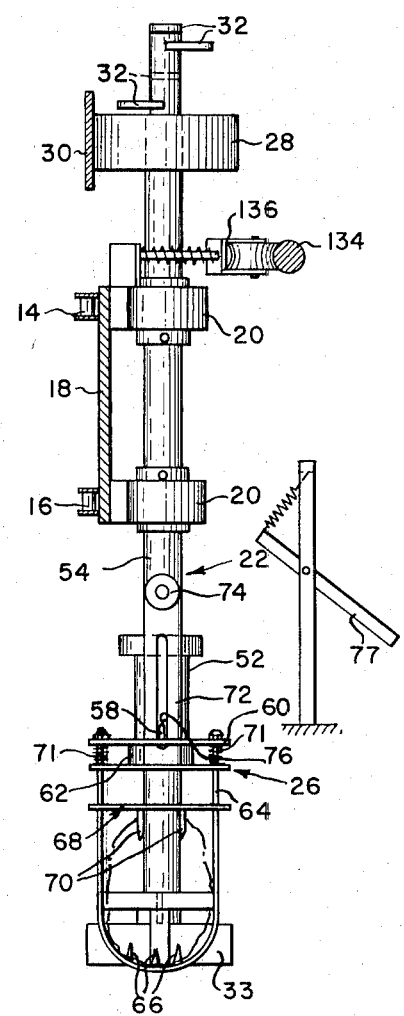
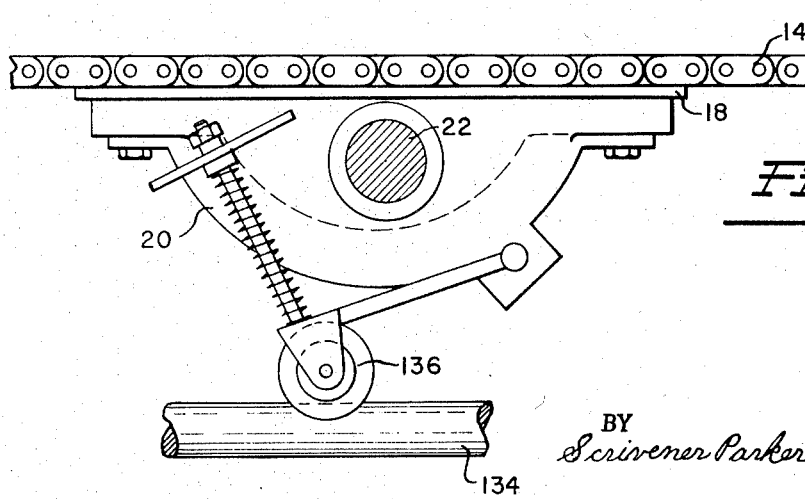
INVENTOR
CALVERT B. TOLLEY
BY
Scrivener Parker Scrivener + Clarke
ATTORNEYS Jan. 19, 1971 C. B. TOLLEY 3,555,595
CRAB MEAT SEPARATING APPARATUS
Filed June 24, 1968 4 Sheets-Sheet 3
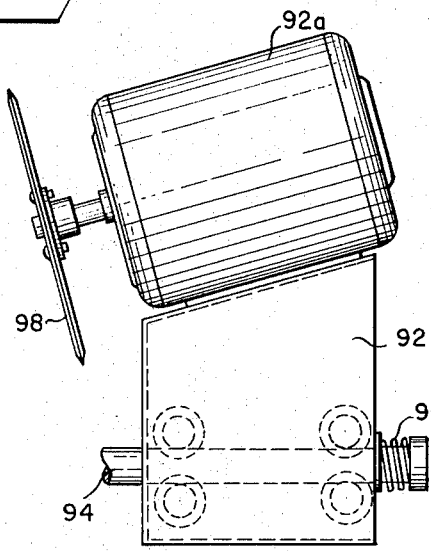
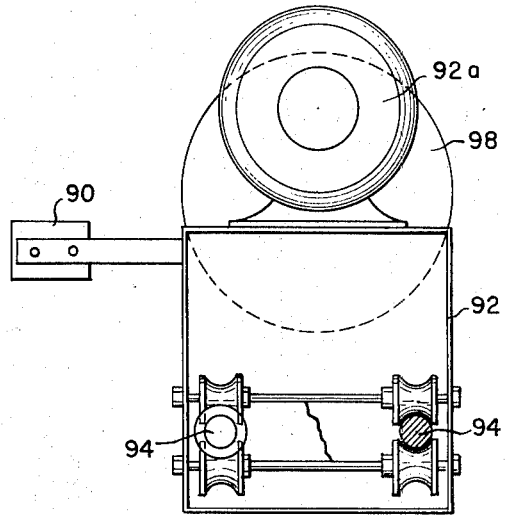
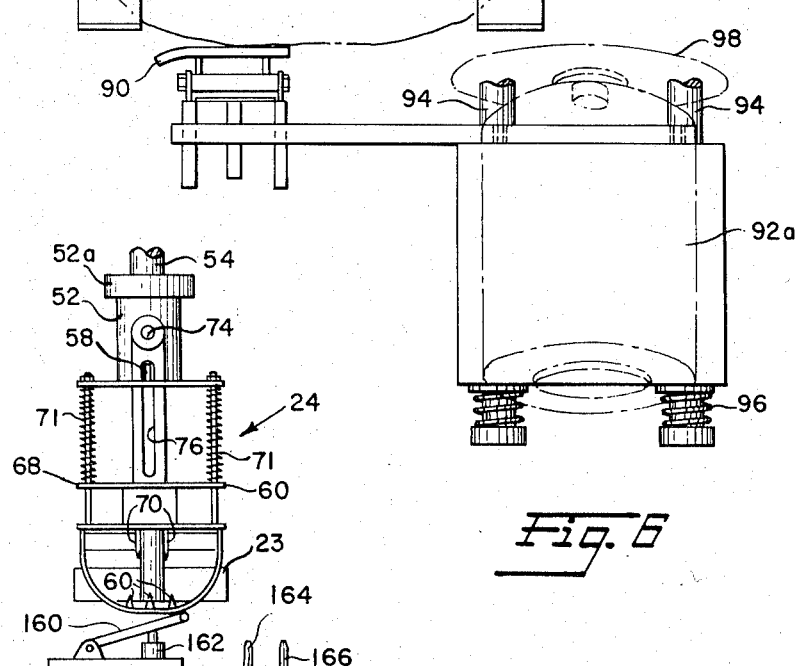
INVENTOR
CALVERT B. TOLLEY
BY
*Scrivener Parker Scrivener & Clarke*
ATTORNEYS

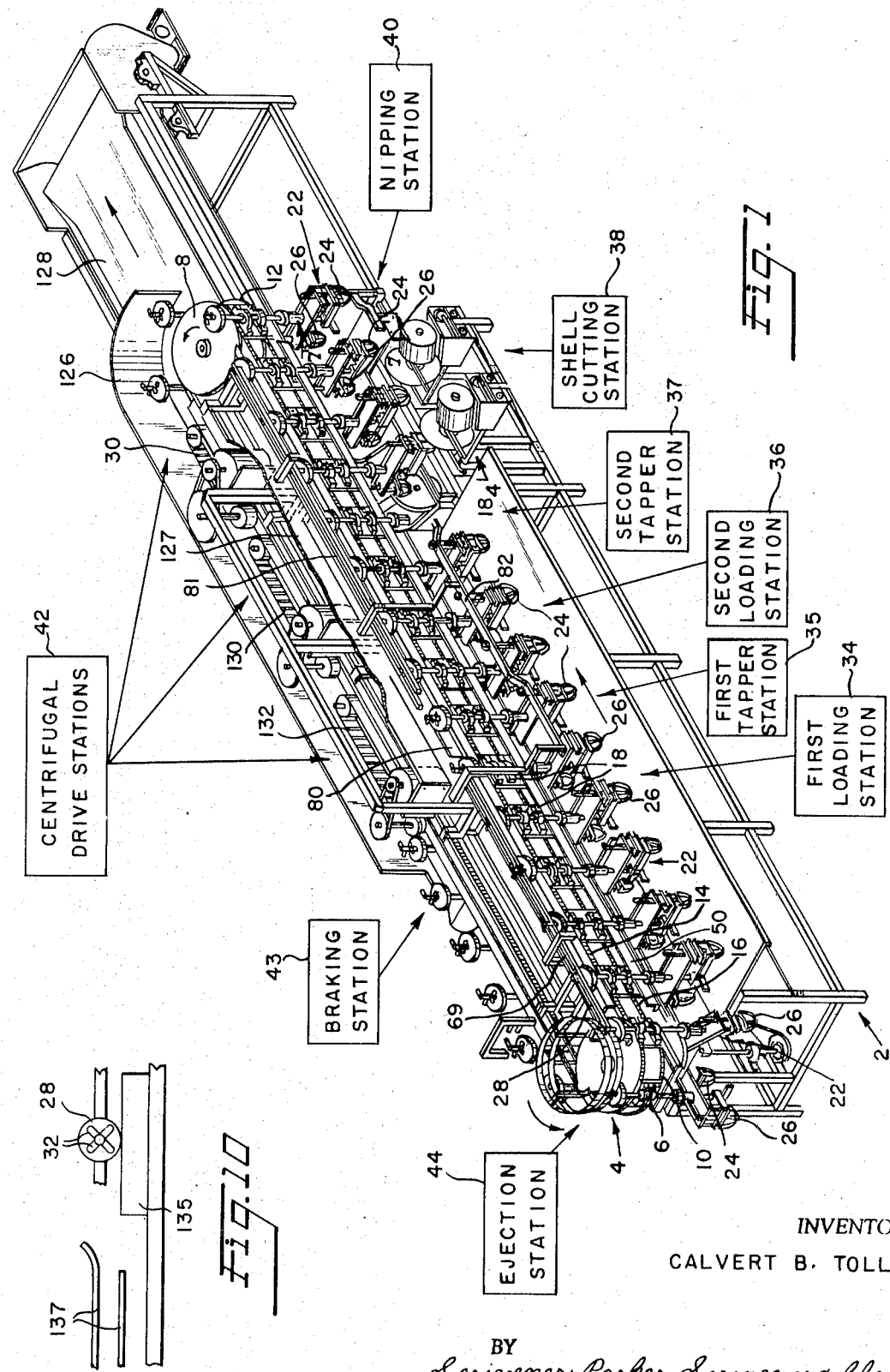

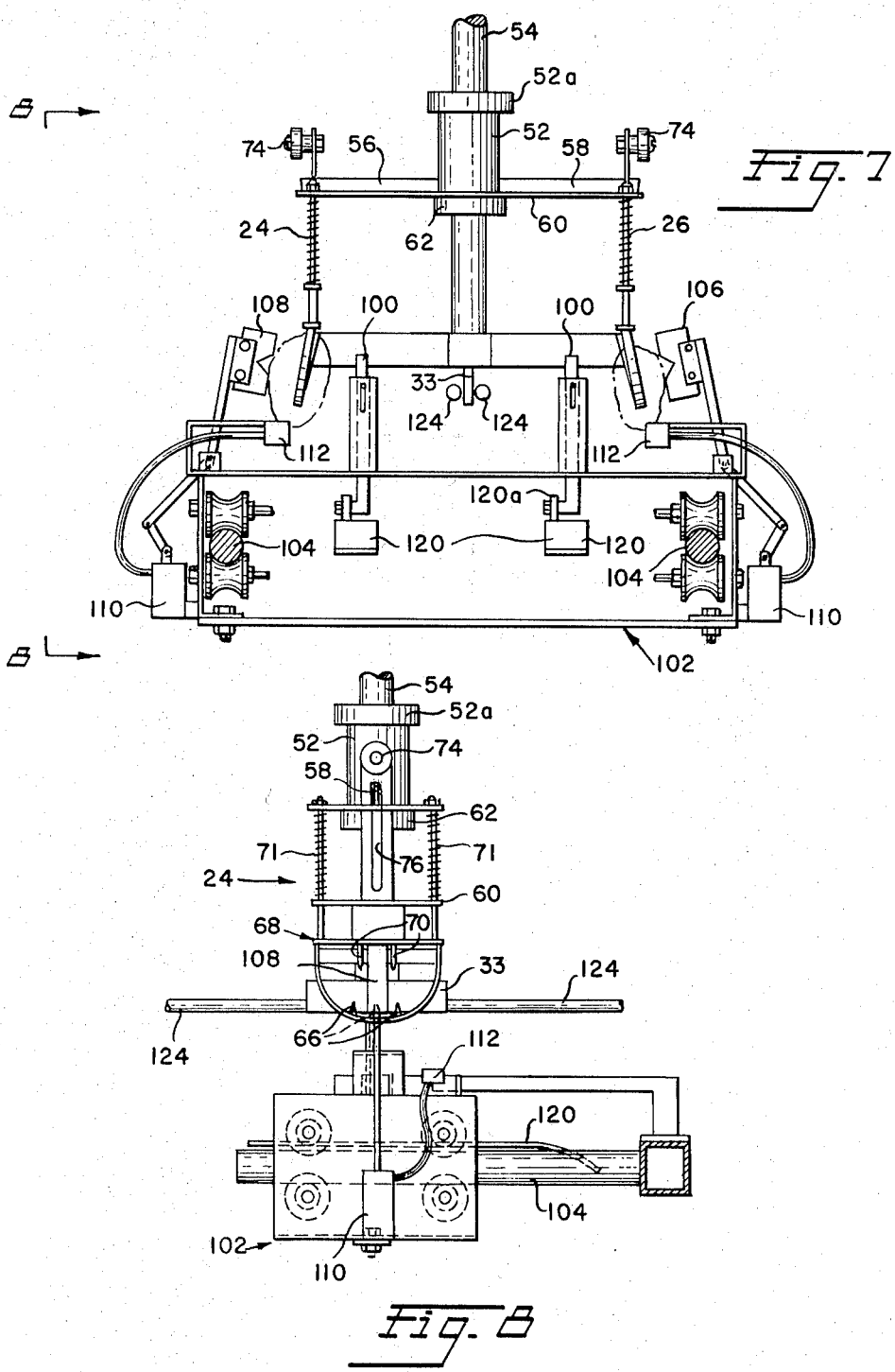

United States Patent Office 3,555,595
Patented Jan. 19, 1971

3,555,595
CRAB MEAT SEPARATING APPARATUS
Calvert B. Tolley, Wingate, Md. 21675
Filed June 24, 1968, Ser. No. 739,495
Int. Cl. A22c 29/00
U.S. Cl. 17—71                                17 Claims

ABSTRACT OF THE DISCLOSURE

Apparatus for centrifugally removing crab meat from crab bodies, characterized by the provision of endless conveyor means for transporting rotor means successively to crab loading station means, shell cutting station means, core nipping station means, and centrifugal separating station means. During centrifuging, the rotors are operated at successively higher speeds to remove first the larger and then the smaller crab meat portions.

---

This invention relates generally to apparatus for removing crab meat from precooked crab bodies, use being made of centrifugal force for effecting separation. In the patented prior art, various types of processing and separating machines have been proposed for automatically separating a crab body into its shell and crab meat portions. The problems of obtaining the largest possible crab meat portions, of reducing the number of shell bits and particles that are mixed with the meat, and of reducing labor costs to a minimum are primary considerations affecting the structural and functional design of the equipment.

The primary object of the present invention is to provide an improved crab meat separating apparatus including centrifugally operated rotor means by means of which the crab meat is removed from the shell. In accordance with the invention, a cooked crab body is clamped to a rotor and is transported therewith by endless conveyor means to a shell cutting station that severs off the top portion of the shell. The rotor is then transported to a nipper station that nips off the cross bone part of the crab core, following which the rotor is transported to a centrifuge station that rotatably drives the rotor at a first rotational speed to remove the large back fin portions from the crab shell. The rotor is then driven at at least one higher speed to centrifugally remove the smaller crab meat particles, whereupon the empty shell is automatically ejected from the rotor.

In accordance with a more specific object of the invention, the rotor means carries at least two radially-spaced diametrically-opposed clamps, and loading station means are provided for properly positioning the rotor and for opening the clamps to permit successive loading of the crab bodies therein.

Pursuant to a further feature of the invention, crab feeler means are provided for automatically adjusting the positions of the cutting means in accordance with the size of the crab body, wherein waste is reduced to a minimum and a more accurate shell cutting operation is obtained.

In accordance with a further object of the invention, the nipper means include a carriage adapted for temporary connection with the rotor for simultaneous travel therewith, whereby accurate nipping of the cross bone portions of the crab body may be effected.

According to a further object of the invention, the centrifugal drive stations include means biasing the rotor, during transport by the endless conveyor means, into drive engagement with successive endless belt means having progressively increasing drive speeds.

Brake means are provided for subsequently stopping rotation of the rotors, and air blast cleaning means are provided for blowing shell particles from the clamps at the end of the cycle.

Other objects and advantages of the invention will become apparent from a study of the following specification when considered in conjunction with the accompanying drawing, in which:

FIG. 1 is a perspective view of the centrifugal crab meat separating apparatus;

FIGS. 2 and 3 are front and side detail views respectively, of the rotor means of FIG. 1 when in the centrifuging condition;

FIG. 4 is a detailed side view of the cutting means taken along line 4—4 of FIG. 1, and FIGS. 5 and 6 are end and top plan views of the cutting means;

FIG. 7 is a detailed transverse view of the nipper means taken along line 7—7 of FIG. 1, and FIG. 8 is an elevational view taken from the left hand side of FIG. 7; and FIG. 9 is a sectional view taken along line 9—9 of FIG. 2, illustrating the means for biasing the rotor into driven engagement with the centrifuge drive means;

FIG. 10 is a top view of the rotor braking means; and

FIG. 11 is a detailed view, with certain parts removed, of the air blast means for cleaning shell particles from the clamps.

Referring more particularly to FIGS. 1–3, the crab meat separating apparatus includes a frame 2 supporting horizontally arranged continuously driven endless conveyor means 4 including two pairs of sprocket gears 6, 8 and 10, 12 upon which are mounted sprocket chains 14 and 16, respectively. Connected between and transported by the sprocket chains are a plurality of bearing plates 18 having vertically arranged bearings means 20 in which are journalled the vertical shaft portions of rotors 22, respectively. As will be described below, each of the rotors carries at its lower end a pair of radially spaced, diametrically opposed clamp means 24, 26 each adapted to receive a precooked crab body from which the crab meat is to be removed. At their upper ends, each rotor 22 includes a fixed wheel portion 28 adapted for driven engagement by centrifugal endless belt drive means 30, and four vertically spaced fixed positioning fingers 32 angularly arranged at 90° intervals, respectively, relative to the axis of rotation of the rotor. At its lower extremity the rotor includes a rigid vertical positioning plate 33.

Successively spaced along the path of travel of endless conveyor means 4 are a first loading station 34, a first tapper station 35, a second loading station 36, a second tapper station 37, a shell cutting station 38, a nipping station 40, a plurality of centrifugal drive stations 42, a braking station 43, and an ejection station 44.

As the rotors are transported toward the first loading station 34, both of the clamp means 24, 26 are opened automatically by first loading cam means 50 secured to the frame 2. More particularly, the rotor 22 includes a sleeve 52 mounted for vertical sliding movement on rotor shaft portion 54, said sleeve carrying rigid diametrically extending arms 56, 58. Normally the sleeve and arms are supported by a horizontal plate 60 which is centrally supported on the rotor by a fixed collar 62. At each end, the plate supports the U-shaped bracket 64 the bridging lower portion of which carries teeth 66 and defines the stationary lower part of the clamp means. The upper clamp part carrying downwardly extending teeth 70. The upper clamp part, which is biased downwardly by springs 71, includes a vertical upper extension 72 that extends through a corresponding opening in the plate and carries at its upper end a cam follower 74. The extension 72 contains a slot 76 receiving the extremity of the corresponding radial arm of movable sleeve 52. Consequently, as the rotor approaches the first loading station 34, cam 50 engages the flange portion 52a of sleeve 52 and operates to lift sleeve 52, arms 56 and 58, and upper clamp parts 68, whereby both clamps are opened. During this travel of the rotor, the rotor is stabilized against rotary movement by the cooperation between positioning fingers 32 and stationary first loading station guide means 69.

At the first loading station, a first crab body is inserted into the adjacent open clamp 26 of the rotor. As the rotor is further transported by the conveyor, the cam 50 permits lowering of sleeve 52 and arms 56, 58, whereby the upper part of empty clamp means 24 is closed. The upper part of the other clamp means 26 is biased downwardly by springs 71 to effect penetration by teeth 66 and 70 into the loaded crab body. A stationary first tapper station 35 includes spring biased pivot arms 77 arranged for engagement by the followers 74 to further assist in displacing the upper clamp member downwardly in penetrating engagement with the crab body.

As the rotor is transported toward the second loading station 36, the positioning fingers 32 are engaged by a stationary operator 80 on the frame 2 to effect rotation of rotor 22 through an angle of 180°, whereby the empty clamp 24 is displaced to an accessible external position. The rotor is now stabilized by second loading station guide rails 81, whereupon second loading station cam means 82 engage the follower 74 of clamp means 24 to raise upper clamp part 68 to permit loading of a second crab body, and upon further travel of the rotor, the cam permits closing of the clamp and penetration of the loaded body by the upper and lower clamp teeth. In both clamps, the crab bodies are manually loaded with the top parts of the shell directed outwardly. The second tapper station means 37, having a structure (not shown) identical to that of the first further assures downward movement of the upper clamp member into penetrating engagement with the crab body.

Referring now to FIGS. 4-6, as the rotor approaches the shell cutting station, the crab bodies carried by each of the clamps 24, 26 are engaged by feeler means 90 that extend from cutter drive motor housings 92 arranged on opposite sides of the conveyor run. Each housing is mounted on a pair of parallel spaced rails 94 for sliding movement normal to the conveyor run, said housings being biased by springs 96 in the direction of the conveyor. In accordance with the thickness of a clamped crab body as detected by the feeler means 90, the housing 92 is displaced outwardly against the force of springs 96, so that the rotary blade 98 will sever only the desired top portion of the crab shell. During this travel relative to the cutting means, the rotor continues to be stabilized against rotation in the bearings 20 by the cooperation between stationary frame rails 81 and the positioning fingers 32.

As the rotor is further transported by the conveyor means, it approaches the nipping station 40 and, as shown in FIGS. 7 and 8, engages the vertically extended pins 100 on the nipping carriage 102. This carriage, which is mounted on stationary rails 104 for reciprocatory movement longitudinally of the conveyor run, carries adjacent the clamps 26 and 24 a pair of double knife means 106, 108 each including stationary and movable knives operable by air cylinder means 110 to sever from the corresponding crab body the cross bone portion. The air cylinder means are actuated by stationary feeler means 112 that are arranged for engagement by the clamps 24 and 26, respectively, during transport of the rotor.

Thus as the carriage is moved simultaneously with the rotor, feeler means 112 operates air cylinders 110 to pivot the double knife means from inoperative positions to the illustrated operative positions, thereby effecting the nipping operation of the crab cores. Upon further travel of the rotor, pins 100 are retracted downwardly by stationary cams 120 to disengage the carriage from the rotor, whereupon the carriage is returned to its original position on rails 104 by return spring means (not shown), and the double knife means are returned to their inoperative positions by suitable return means (such as air cylinder operated means, spring means or the like, not shown). During this nipping operation, the rotor is stabilized against rotation by the cooperation between rotor plate 33 and the nipper station guide rail means 124.

The rotor is finally transported to the first centrifuge station wherein the rotor wheel portion 28 engages drive belt 30, so that the rotor is driven at a first relatively high speed to remove centrifugally the large back fin chunks of meat from the core. The separated crab meat strikes the outer and inner stationary shields 126, 127, respectively, and is deposited by gravity upon the endless conveyor 128 for deposition at one end into suitable receptacles, not shown. The rotor is then further transported to a second drive belt 130 that drives the rotor at a higher speed to separate smaller crab meat particles, and finally to a high speed belt 132 that effects centrifugal separation of the finest crab meat particles. In order to effect the necessary frictional engagement between rotor wheel 28 and the drive belts 30, 130, and 132, a stationary rail 134 (FIG. 9) is provided on the frame opposite the conveyor means 4 for engagement by a spring-biased follower 136 carried by the bearing plate 18. As the follower rolls on the rail, the bearing plate and conveyor are biased away from the rail 134 to urge wheel 28 into frictional engagement with the centrifugal drive belt.

Following centrifugal separation of the crab meat from the shell, the rotor is braked by the cooperation between wheel portion 28 and stationary resilient braking block 135 (FIG. 10), whereupon the rotor is given a desired orientation by the cooperation between fixed rails 137 and the positioning fingers 32. As the rotor is transported to the ejection station 44, the sleeve 52 is elevated automatically by suitable cam means, not shown, similar to the cam 50 to effect opening of both clamp means and ejection of the empty shells from the rotor. As shown in FIG. 11, the ejector station includes also air blast means for cleaning particles from the clamps. More particularly, stationary feeler means 160 are operated by the positioning plate 33 to operate valve means 162 to supply air to the nozzles 164, 166, whereby shell particles are blown from the clamps.

It is apparent that the disclosed apparatus is designed for high speed operation with a minimum amount of labor, since only one operator at each of the loading stations is required. The apparatus is particularly adapted for processing the core portions of cooked crab bodies that have been previously processed by known coring machines to remove the finger and leg portions.

While in accordance with the provisions of the patent statutes I have illustrated and described the preferred forms and embodiments of the invention now known to me, it will be apparent to those skilled in the art that changes may be made in the described apparatus without deviating from the invention set forth in the following claims.

What is claimed is:

1. Apparatus for separating the meat portion from the shell portion of a cooked crab body, comprising
   a rotor;
   clamp means for clamping the crab body to the rotor;
   shell cutting means for severing from the clamped crab body a given first portion of said shell;
   centrifugal drive means for initially driving said rotor at a given first speed to remove centrifugally from the shell the larger back fin meat portion, said centrifugal drive means being subsequently operable to drive said rotor at a higher second speed to remove centrifugally from the shell the smaller crab meat portions; and
   means for collecting said back fin and said smaller crab meat portions, respectively.

2. Apparatus for separating the meat portion from the shell portion of a cooked crab body, comprising rotor means including a rotor, and bearing means rotatably supporting said rotor;

clamp means for clamping the crab body to the rotor;

endless conveyor means connected with said bearing means for transporting said rotor laterally along an endless path;

shell cutting means arranged adjacent said endless conveyor means for initially severing from the clamped crab body a given first portion of said shell; and centrifugal drive means arranged adjacent said endless conveyor in spaced relation to said shell cutting means for subsequently rotatably driving said rotor at a given first speed to remove centrifugally from the severed crab body the back fin meat portion.

3. Apparatus as defined in claim 2, and further including loading means for automatically opening said clamp means for the insertion of a crab body prior to the transport of said rotor to said cutting means.

4. Apparatus as defined in claim 3, and further including ejection means for automatically opening said clamp means for ejection of the crab body therefrom following transport of said bearings means from said centrifugal drive means.

5. Apparatus as defined in claim 2, wherein the axis of rotation of said rotor is normal to the path of travel of said conveyor means;

and further wherein said clamp means comprises a pair of clamps carried by said rotor in radially spaced diametrically opposed relationship relative to said axis of rotation.

6. Apparatus as defined in claim 5, and further wherein said loading means comprises first and second loading stations spaced successively of said conveyor path of travel;

and further including means for rotating said rotor through an angle of 180° as it is transported between said first and second loading stations, whereby a first one of the clamp means carried by the rotor is positioned for loading at one loading station and the other clamp means is positioned for loading at the other station.

7. Apparatus as defined in claim 6, and further wherein said loading means includes first cam means for automatically opening both of said clamp means at said first loading station, and second cam means for opening only the other of said clamp means at the second loading station.

8. Apparatus as defined in claim 5, and further including nipping means for nipping from the crab core the small cross bone portion, said nipping means being arranged adjacent said endless path between said cutting means and said centrifugal drive means.

9. Apparatus as defined in claim 8, and further wherein said nipping means comprises carriage means arranged for reciprocatory movement longitudinally of the conveyor, means releasably connecting said carriage means with said rotor for simultaneous travel therewith, nipper station guide means temporarily preventing rotation of said rotor relative to said bearings during transport of said carriage means with the rotor, a pair of double knife means carried by said carriage adjacent the clamps on said rotor, respectively, and means for operating said double knife means.

10. Apparatus as defined in claim 5, and further wherein said shell cutting means comprises cutting station guide means temporarily preventing rotation of said rotor in said bearings means, and a pair of cutting means arranged on opposite sides of said conveyor means for cutting shell portions of the crabs mounted in said clamps, respectively.

11. Apparatus as defined in claim 10, and further including means mounting said cutting means for adjustment transversely of said conveyor, and feeler means for engaging a crab body to vary the position of said cutting means relative to said clamp means in accordance with the size of the crab body.

12. Apparatus as defined in claim 5, wherein said centrifugal drive means comprises first endless drive belt means adjacent and parallel with said conveyor means for driving said rotor at said given first speed.

13. Apparatus as defined in claim 12, and further wherein said centrifugal drive means comprises second endless belt means for driving said rotor at a second speed higher than the first speed to remove centrifugally further crab meat portions from the shell.

14. Apparatus as defined in claim 13, and further including stationary rail means parallel with and spaced from at least one of said endless belt means, and means carried by said rotor for engagement by said rail means to urge said rotor into frictional driven engagement with said one endless belt means.

15. Apparatus as defined in claim 12, and further including means for braking said rotor following rotation thereof by said centrifugal drive means.

16. Apparatus as defined in claim 3, and further including tapper means for tapping together the clamp means following the insertion of a crab body therein.

17. Apparatus as defined in claim 4, and further including air blast means for cleaning shell particles from said clamp means following ejection of the crab body therefrom.

References Cited

UNITED STATES PATENTS

| | | | |
|---|---|---|---|
| 2,522,578 | 9/1950 | Johnson | 17—48 |
| 2,771,630 | 11/1956 | Hiller | 17—71 |
| Re. 26,136 | 1/1967 | Rossnan | 17—71 |
| 3,302,236 | 2/1967 | Harris | 17—71 |
| 3,370,319 | 2/1968 | Houghton et al. | 17—71 |

LUCIE H. LAUDENSLAGER, Primary Examiner